W. R. ROSE.
Pruning Implement.
No. 209,587.     Patented Nov. 5, 1878.
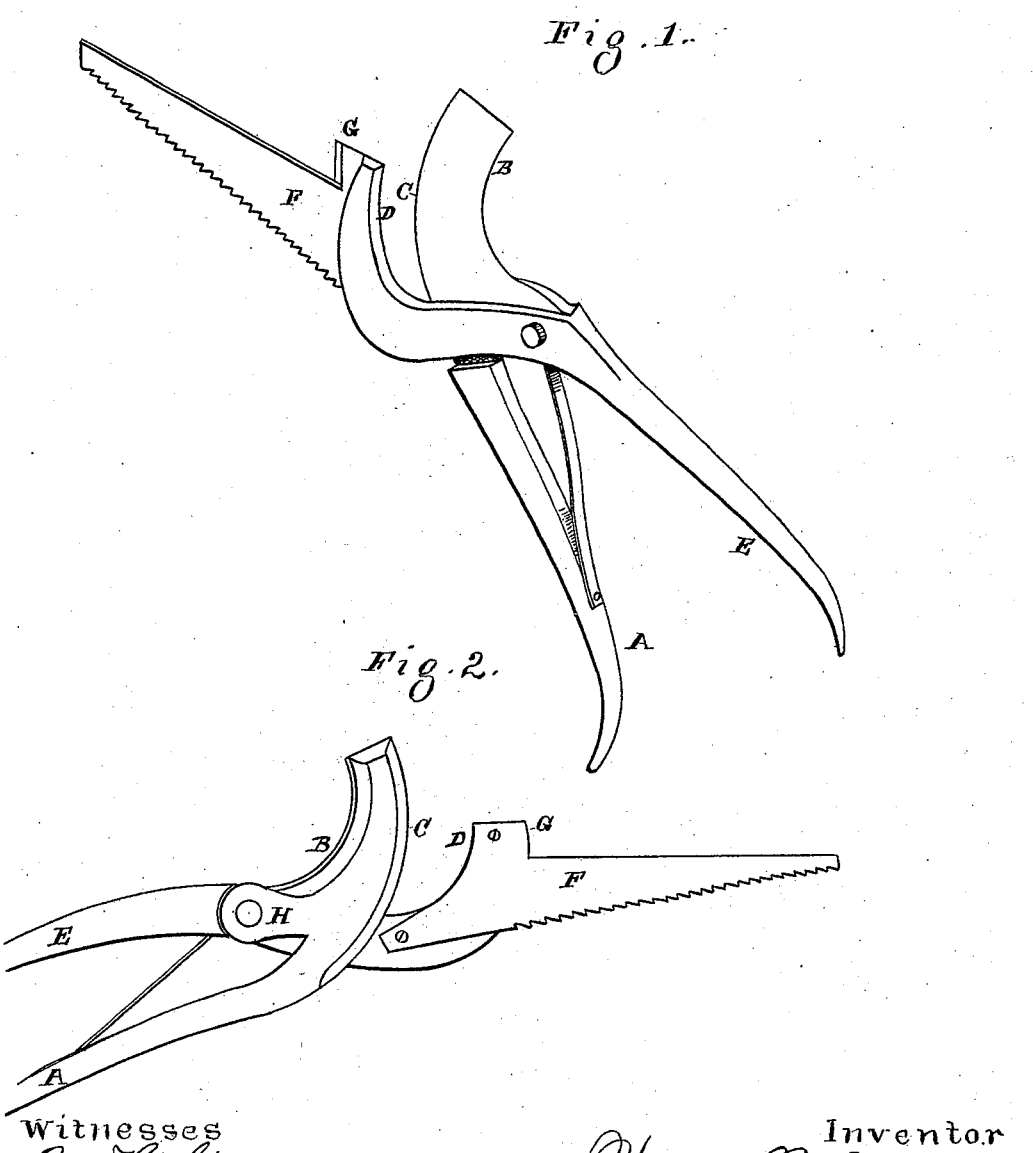
Witnesses
Geo. H. Strong
Frank A. Brooks
Inventor
William R. Rose
by Dewey & Co.
attys.

UNITED STATES PATENT OFFICE.

WILLIAM R. ROSE, OF GLENNVILLE, CALIFORNIA.

IMPROVEMENT IN PRUNING IMPLEMENTS.

Specification forming part of Letters Patent No. 209,587, dated November 5, 1878; application filed May 6, 1878.

*To all whom it may concern:*

Be it known that I, WILLIAM R. ROSE, of Glennville, county of Kern, and State of California, have invented an Improved Pruning Implement; and I do hereby declare the following to be a full, clear, and exact description thereof, reference being had to the accompanying drawings.

My invention relates to that class of pruning implements in which several devices are combined in one implement.

It consists in joining together two curved and peculiarly-shaped handles, so as to form a pair of shears with a curved edge; also, for chopping or pruning, a serrated edge to form a saw and a projection which answers as a chisel for grafting purposes, all combined in the one implement, as hereinafter described.

Referring to the accompanying drawings, Figure 1 is a perspective view. Fig. 2 is a side view.

The two handles of the implement are each made in a peculiar shape, as shown, and are joined together in the usual manner of shears of any description.

On the inner side of the handle A is a spring, which keeps the handles apart, except when pressed together in the act of cutting. On the inner upper side of this handle A is bolted a curved steel plate to conform to the shape of that part of the handle, and having both edges sharpened to form cutting-edges.

The lower or concave part, B, forms a pruning or chopping knife, so that by grasping the handles tightly, cutting or chopping may be done with this part of the implement.

The upper or convex part, C, of this blade forms a curved edge, which, in combination with the part D of the rear end of the saw-blade on the other handle, makes a pair of shears. The back of the handle A from the cutting-edges is beveled off, as shown, so as to form a continuation of the cutting-edge on each side.

The handle E has formed on its upper end a blade, F, one edge of which is serrated, so as to form a saw, as shown. On the upper rear edge of this blade F is a projection, which forms a chisel, G, and the curved part D is brought to a sharp edge, so as to form half of the shears, of which the other part is represented at C on the handle A.

I thus form in one implement a cutter or pruner, a pair of shears, a chisel, and a saw. The cutter may be used for chopping off branches or pruning them, the saw for cutting off larger limbs, the chisel for cutting out branches or limbs for grafting, and the shears for pruning the trees of twigs and superfluous shoots, &c.

The handle A is constructed, as before described, with a peculiar curve, and has an extension, H, through which the bolt joining the handles passes, as shown. The relative position of this bolt to the arc of the circle, which forms the cutting-edge of the shear-blade or the handle A, makes this blade eccentric in its action, and this gives a very peculiar drawing cut to the shear-blade by the act of closing the shears, which is much more powerful and effective than it would be if the pin were in the usual position.

Having thus described my invention, I do not claim, broadly, the combination of various pruning implements, as I am aware that such combinations have heretofore been made; but

What I do claim as new, and desire to secure by Letters Patent, is—

1. In a pruning implement, the saw F, attached to the handle E, the rear edge of the saw forming the cutting-blade D, and provided with the projecting chisel G, in combination with the cutting-blade C, substantially as and for the purpose set forth.

2. The handle A, having the concave and convex plate secured to one side, so that its convex edge C forms one blade of a shears, and the concave edge B forms a pruning-knife, in combination with the handle E, having the saw F rigidly secured to it, and the lower end of the saw forming the blade D of the shears, substantially as herein described.

In witness whereof I hereunto set my hand and seal.

WILLIAM RILYE ROSE. [L. S.]

Witnesses:
JOHN W. BOWLES,
R. B. CROSLING.